United States Patent [19]

Berndt

[11] 4,447,164
[45] May 8, 1984

[54] TEMPERATURE-RESPONSIVE PACIFIER ASSEMBLY

[75] Inventor: Dieter R. Berndt, Neptune, N.J.

[73] Assignee: TRP Energy Sensors, Inc., New York, N.Y.

[21] Appl. No.: 351,107

[22] Filed: Feb. 22, 1982

[51] Int. Cl.³ .................. G01K 11/12; G01K 1/08
[52] U.S. Cl. ............................ 374/162; 128/359; 128/736; 374/151
[58] Field of Search ............... 374/162, 151, 156, 192, 374/142; 428/1; 350/351; 116/216; D10/57; 128/359, 736

[56] References Cited

U.S. PATENT DOCUMENTS

| 2,091,693 | 8/1937 | Spencer | 374/156 |
|---|---|---|---|
| 3,117,450 | 1/1964 | Hoy | 374/151 |
| 3,483,752 | 12/1969 | Rogen et al. | 116/216 |
| 3,520,189 | 7/1970 | Mann | 374/156 |
| 3,935,743 | 2/1976 | Brodie et al. | 374/151 |
| 3,968,690 | 7/1976 | Blouin et al. | 374/151 |
| 3,974,317 | 8/1976 | Sharples | 374/162 X |
| 4,022,706 | 5/1977 | Davis | 374/162 |
| 4,296,631 | 10/1981 | Fergason | 374/162 X |

Primary Examiner—Daniel M. Yasich
Attorney, Agent, or Firm—Louis E. Marn; Elliot M. Olstein

[57] ABSTRACT

There is disclosed a temperature responsive pacifier assembly comprised of a liquid crystal material in a liquid and responsive to a temperature above about 100° F., whereby the liquid crystal material changes color to visuably indicate an abnormal temperature condition of an individual utilizing the pacifier assembly, as well as a process for manufacture same.

9 Claims, 2 Drawing Figures

TEMPERATURE-RESPONSIVE PACIFIER ASSEMBLY

FIELD OF THE INVENTION

This invention relates to a pacifier, and more particularly to a temperature-responsive pacifier.

BACKGROUND OF THE INVENTION

Oral and rectal thermometers having a temperature range of from about 92° to 106° F. have been in use for many years for sensing the temperature of the human body. The use of oral thermometers with infants is particularly troublesome due to the difficulty of keeping such a thermometer in the baby's mouth under conditions and for a time sufficient to permit the inserted portion of the thermometer to reach ambient conditions therein and thereby produce a reasonably accurate reading of the actual temperature of the subject being temperature sensed. Consequently, for newborns, rectal thermometers are generally used which are believed to cause discomfort, and again are somewhat difficult to use, although not as difficult as the use of oral thermometers. Another form of temperature sensing devices is illustrated in U.S. Pat. No. 4,296,631 to Fergason.

As infants age with concomitant cutting of teeth, the use of an oral thermometer becomes hazardous due to the possibility of breakage as well as greater awareness by the subjects to the foreign object. Generally, the use of a thermometer is to generate data as to the existence of abnormal temperature, i.e., a temperature above 98.6° F., and not necessarily the number of °F. above normal temperature to permit the institution of a corrective protocol for the subject exhibiting an above normal temperature. The use of a thermometer for a subject is generally initiated based upon observable side effects of an abnormal temperature, e.g. skin color, respiration, etc. as distinguished from any constantly observable or recognized phenomena.

OBJECTS OF THE INVENTION

It is an object of the present invention to provide a novel device for sensing an above normal temperature of a mammal, and in particular, homo sapien.

Another object of the present invention is to provide a novel device for sensing an above normal temperature of a mammal permitting of more frequent temperature sensing time intervals.

Still another object of the present invention is to provide a novel reuseable device for sensing an above normal temperature of a mammal.

A further object of the present invention is to provide a novel device for sensing an above normal temperature of a mammal readily and conveniently useable by the suspect mammal.

A still further object of the present invention is to provide a novel device for sensing an above normal temperature of a mammal essentially requiring no external intervention.

Yet another object of the present invention is to provide a novel device for sensing an above normal temperature of a mammal which is formed by non-toxic materials.

Still another object of the present invention is to provide a novel device for sensing an above normal temperature of a mammal exhibiting extended shelf life.

A further object of the present invention is to provide a novel device for sensing an above normal temperature of a mammal exhibiting extended useful life.

A still further object of the present invention is to provide a novel device for sensing an above normal temperature of a mammal capable of withstanding over extended periods of time external forces, such as shearing forces developed between rows of teeth in upper and lower mandibles.

SUMMARY OF THE INVENTION

These and other objects of the present invention are achieved by a pacifier assembly including a liquid crystal material responsive to a temperature above 100° F. whereby the liquid crystal material changes color to visually indicate abnormal temperature condition of a mammal, and in particular a *homo sapien*, utilizing such a pacifier assembly.

BRIEF DESCRIPTION OF THE DRAWINGS

A better understanding of the present invention as well as other objects and advantages thereof will become apparent upon consideration of the detailed disclosure thereof, especially when taken with the accompanying drawing, wherein.

DETAILED DESCRIPTION OF THE INVENTION

Figure 1:
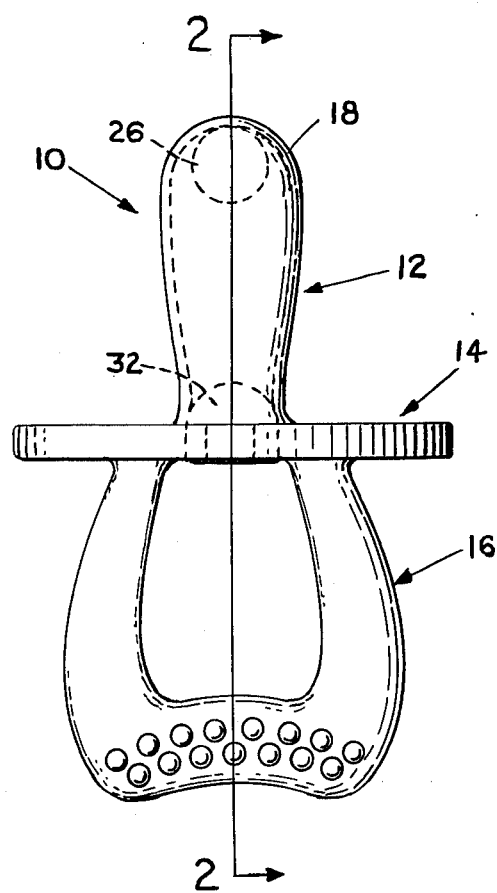
FIG. 1 is an elevational view of the pacifier assembly of the present invention.
Figure 2:
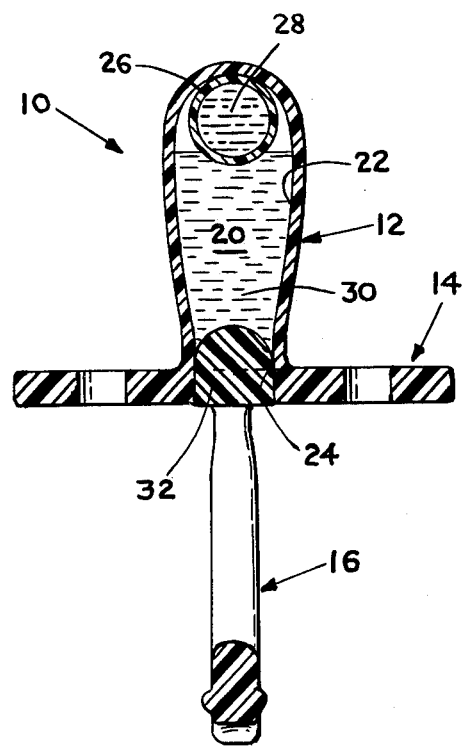
FIG. 2 is a cross-sectional view taken along the lines of 2—2 of FIG. 1.

Referring now to FIGS. 1 and 2, there is illustrated a temperature sensing pacifier assembly, generally indicated as 10, comprised of a bulb or nipple portion, a preventing guard portion and a handle portion, generally indicated as 12, 14 and 16, respectively. The pacifier assembly of the present invention is formed of a non-toxic elastomeric material, such as a foodgrade plasticized polyvinyl chloride or synthetic rubber, or the like.

The nipple portion 12 is defined by an outer bulbous surface 18 and is formed with an interior chamber 20 defined by an inner surface 22 with an orifice 24 in the guard portion 14 providing access to the chamber 20 thereof. In the chamber 20 of the nipple portion 12 opposite the orifice 24, there is provided a capsule 26 including a liquid crystal material 28 floating in an elastomeric compatible material, as hereinafter more fully described. The liquid capsule 26 in the elastomeric compatible liquid 30 is sealed within the chamber 20, of the pacifier assembly 10 by a food grade plasticized vinyl chloride plug 32 suitably sealed within the chamber 20 such as by an adhesive or by ultrasonics or the like. Use of such an elastomeric material for the pacifier assembly 10 as well as the plug 32 is dictated by the desirability of durability of substantially prevent breakage of the capsule 26 under extreme pressures and to eliminate direct shearing conditions under which the outer surface 18 of the nipple portion 12 of the pacifier assembly 10 may be subjected against the capsule, particularly during teething of a using individual.

The capsule 26 is preferably formed of a gelatinous material, such as a glycerine/gelatin non-toxic vitamin based substance, and of a diameter of from about 0.20 to 0.23 inches. A gelatinous material is preferred over a more crystalline material, such as glass which could aid in destruction of the nipple portion 12 of the pacifier assembly 10 by a teething user. The elastomeric compatible liquids are thermally conductive, such as glycerine, a fluid which does not de-plasticize the plasticized polyvinyl chloride when compared to most vegetable and mineral oils. The use of such vegetables and mineral oils is not desired since said oils dissolve the plasticized materials thereby permitting the nipple assembly to become tough and rigid over short periods of time. Glycerine, not being an oil does not de-plasticize the polyvinyl chloride composition forming the nipple assembly 10 and is compatible with the material forming the capsule 26.

Liquid crystals are well known to one skilled in the art. Liquid crystals materials formulations displaying a color change above 98.6° F., and preferably at a temperature above about 100° F. include a temperature of about 100° F.$\pm\frac{1}{4}$° F. is preferred as being representative of a temperature through which a positive identification may be made that a feverous condition exists above the normal body temperature of 98.6° F. Additionally, such a temperature level generally represents a lowest safe-zone reading. Chloresteric liquid crystals are preferred since such chloresteric liquid crystals are non-toxic and readily passed through the body if accidentally ingested by the pacifier user. Example of an chloresteric liquid crystal exhibiting a color change display at 100° F. is a mixture of p-n-Pentylphenyl-p-methoxybenzoate (PPMEOB) and p-n-Pentylphenyl-p-n-pentylbenzoate (PPPEB). Other chlorecstoric liquid crystal materials exhibiting like display temperatures are disclosed in the aforementioned United States Letters Patent to Fergason.

The temperature sensitive pacifier assembly 10 of the present invention is facilely prepared from a pre-formed pacifier by placing the nipple position 12 of the pacifier in a vertically-disposed downward position. The capsule 26 including the liquid crystal 28 is introduced into the chamber 20 via the orifice 24 with the chamber 20 being prefilled or thereafter filled with the elastomeric compatible liquid 30. A plug 32 of a like elastomeric material is disposed in the orifice 24 and is affixed to the inner wall 22 of the nipple assembly 10, such as by an adhesive, to seal the chamber 20, preferably in an airtight manner. The liquid material 30 being compatible with the capsule 26 and the plasticized polyvinyl chloride component of the nipple assembly 10 thereby minimizes any long term chemical interact between the gelatinous material of the capsule 26 with the elastomeric material of the pacifier assembly 10.

EXAMPLE OF THE INVENTION

The following example is illustrative of conditions for the process of the invention and it is to be understood that the scope of the invention is not to be limited thereby.

A preformed pacifier formed of a polyvinyl chloride polymer is positioned with the nipple portion 12 extending in a vertically downward position. A clear glycerine at a flowable temperature of 80° F. is introduced via the orifice 24 into the chamber 20. A capsule 26 formed of 40 weight percent glycerine, 50 weight percent gelatine and 10 weight percent sorbitol encapsulating a liquid crystal of the following composition is inserted via the orifice 24 into the chamber 20:

| Composition | Wt. Percent |
|---|---|
| PPMEOB | 75 |

| Composition | Wt. Percent |
|---|---|
| PPPEB | 25 |
|  | 100 |

Such liquid crystal displays a bright green iridescent color at ambient room temperature and undergoes a color change to clear at a temperature of about 100° F.$\pm\frac{1}{4}$° F. The pacifier assembly 10 is then sealed with a clear PVC cement which is allowed to form a permeating miniscus type geometry at the pre-filled pacifier orifice 24, such a PVC cement being of a composition similar to the pacifier assembly 10. The thus formed temperature sensitive pacifier assembly 10 is maintained in the hereinabove described position for a period of at least about 12 hours prior to bulk packaging.

Once the pacifier assembly 10 of the present invention changes color indicating an abnormal temperature level as a result of use by an individual, resort to a mercurial thermometer is generally contemplated as part of a use protocol of the instant invention. Once removed from the mouth of a user, the liquid crystal material will resume its initial color after a predetermined time period at ambient room temperature.

While the present invention has been described with a liquid crystal displaying color change temperature level of 100° F.$\pm\frac{1}{4}$° F., it will be understood by one skilled in the art that slight variations may be made to such color change temperature level. One skilled in the art will appreciate that the composition of the liquid crystal may be formulated to effect different color changes, e.g. green to black, or some other color changing protocol.

Generally, liquid crystal materials displaying the desired color changing protocol herein described generally are adversely affected by the elastomeric material of the pacifier and thus cannot be formulated, per se, in the elastomeric material of the pacifier assembly although some liquid crystals may exist which may be included in such a formulation. Microencapsulation of the liquid crystal materials, as distinguished from macroencapsulation as herein described, would permit formulation with the elastomeric material, particularly for molding the nipple portion of the pacifier assembly thereby providing a more efficacious process for forming such temperature responsive pacifier assemblies.

Numerous modifications and variations of the invention are possible in light of the above teachings and therefore the invention may be practiced otherwise than as particularly described.

What is claimed is:

1. A heat-responsive pacifier assembly comprised of a pacifier body including a nipple portion having a chamber, a liquid sealingly disposed in said chamber and a liquid crystalline composition disposed in said liquid, said liquid crystal composition displaying a color change visually through said pacifier body at a temperature above 98.6° F.

2. The heat-responsive pacifier assembly as described in claim 1 wherein said liquid crystal composition displays a color change at a temperature of 100° F.

3. The heat-responsive pacifier assembly as defined in claim 2 wherein said liquid crystalline composition is encapsulated within a capsule.

4. The heat-responsive pacifier assembly as defined in claim 3 wherein said capsule is formed of a gelatinous-based material.

5. The heat-responsive pacifier assembly as defined in claim 4 wherein said capsule is disposed within said chamber of said nipple portion of said pacifier, said chamber being sealed by an elastomeric material.

6. The heat-responsive pacifier assembly as defined in claim 5 wherein said liquid is inert to said elastomeric material and said capsule.

7. The heat-responsive pacifier assembly as defined in claim 6 wherein said liquid is glycerine.

8. The heat-responsive pacifier assembly as defined in claim 5 wherein said elastomeric material is a glycerine base elastomer.

9. The heat-responsive pacifier assembly as defined in claim 5 wherein said elastomeric material is a glycerine base elastomer polyvinyl chloride.

* * * * *